United States Patent
van Haalen et al.

(10) Patent No.: US 7,539,133 B2
(45) Date of Patent: May 26, 2009

(54) METHOD AND APPARATUS FOR PREVENTING CONGESTION IN LOAD-BALANCING NETWORKS

(75) Inventors: Ronald van Haalen, Hengelo (NL); Arie Johannes de Heer, Hengelo (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 601 days.

(21) Appl. No.: 11/387,321

(22) Filed: Mar. 23, 2006

(65) Prior Publication Data

US 2007/0223372 A1      Sep. 27, 2007

(51) Int. Cl.
*H04L 12/26* (2006.01)
(52) U.S. Cl. ...................................... 370/229
(58) Field of Classification Search ........................ None
See application file for complete search history.

(56) References Cited

U.S. PATENT DOCUMENTS

| | | | | |
|---|---|---|---|---|
| 4,769,810 A | * | 9/1988 | Eckberg et al. | 370/232 |
| 5,790,522 A | * | 8/1998 | Fichou et al. | 370/236 |
| 6,144,635 A | * | 11/2000 | Nakagawa | 370/229 |
| 6,310,881 B1 | * | 10/2001 | Zikan et al. | 370/401 |
| 6,510,135 B1 | * | 1/2003 | Almulhem et al. | 370/229 |
| 6,587,469 B1 | * | 7/2003 | Bragg | 370/401 |
| 6,788,686 B1 | * | 9/2004 | Khotimsky et al. | 370/394 |
| 7,440,404 B2 | * | 10/2008 | Nagesh et al. | 370/235 |

OTHER PUBLICATIONS

Nagesh et al, Load-Balanced Architecture for Dynamic Traffic, IEEE, 3 pages, 2005.*
U.S. Appl. No. 10/785,352, filed Feb. 24, 2004, Nagesh et al.

* cited by examiner

*Primary Examiner*—Frank Duong

(57) ABSTRACT

The invention includes a method and apparatus for processing traffic in a load-balancing network comprising a plurality of nodes. The method includes determining an egress node associated with each of a plurality of packets of a traffic flow received at an ingress node of the plurality of nodes, determining, for each packet, whether a congestion condition exists on the egress node, and processing the packets such that packets associated with egress nodes for which the congestion condition does not exist have a different queuing priority within the load-balancing network than packets associated with egress nodes for which the congestion condition exists. The ingress node on which the traffic flow is received is adapted for splitting the traffic flow into a plurality of traffic flow portions independent of the egress node by which each packet is scheduled to exit the load-balancing network.

22 Claims, 7 Drawing Sheets

100

104A

300

104_A

500

METHOD AND APPARATUS FOR PREVENTING CONGESTION IN LOAD-BALANCING NETWORKS

FIELD OF THE INVENTION

The invention relates to the field of communication networks and, more specifically, to preventing congestion in load-balancing networks.

BACKGROUND OF THE INVENTION

Load-balancing networks are generally deployed for exchanging traffic between networks in a manner for handling dynamic traffic loads. In a load-balancing network, only ingress traffic speeds entering the load-balancing network and egress traffic speeds leaving the load-balancing network are known (i.e., the exact traffic between nodes of the load-balancing network are unknown). As such, since load-balancing networks generally distribute traffic load equally over the load-balancing network, all possible traffic matrices may be supported. In general, a given load for a network of N nodes may be expressed as an N×N traffic matrix, where each traffic matrix entry (row i, column j) defines the traffic load from one node (node i) to another node (node j).

In general, a load-balancing network operates according to a load-balancing algorithm subject to a set of constraints collectively known as the hose constraint. A traffic matrix meeting the hose constraint is considered a valid traffic matrix. In general, the hose constraint requires that: (1) the sum of the columns of the N×N matrix, for any row i, does not exceed the agreed ingress traffic rate at node i, and (2) the sum of the rows of the N×N matrix, for any column j, does not exceed the agreed egress traffic rate at node i. While limiting ingress traffic such that the hose constraint is satisfied is simple (e.g., setting ingress link capacity to provide a hard limit on ingress load or using a policer for maintaining the ingress load below ingress link capacity), limiting egress traffic such that the hose constraint is satisfied is difficult.

The limiting of egress traffic such that the hose constraint is satisfied may be achieving using various existing solutions. For example, limiting of egress traffic may be achieved using token bucket egress policing (without buffers), leaky bucket egress policing (having buffers)), or setting link speeds equal to the egress hose constraint. Disadvantageously, however, the token bucket solution results in Transmission Control Protocol (TCP) throughput reductions, and the leaky bucket and link speed solutions result in queuing and, therefore, additional delay in response to hose constraint violations. Furthermore, for each of these existing solutions (i.e., token bucket, leaky bucket, and link speed solutions), bandwidth may be wasted.

Furthermore, difficulty in limiting egress traffic for satisfying the hose constraint is primarily caused by the fact that nodes are not aware of the traffic load received by other nodes. Moreover, this difficulty may be exacerbated by certain services. For example, for broadcast services, one packet sent from an ingress node to an intermediate node may be replicated at the intermediate node. This replication results in an increase in egress traffic load, typically resulting in a violation of the hose constraint if there is insufficient egress capacity to support the increased egress load. Furthermore, when several services (from different customers) share an egress link and one of the services violates the hose constraint, the other services experience service performance degradation.

SUMMARY OF THE INVENTION

Various deficiencies in the prior art are addressed through the invention of a method and apparatus for processing traffic in a load-balancing network comprising a plurality of nodes. The method includes determining an egress node associated with each of a plurality of packets of a traffic flow received at an ingress node of the plurality of nodes, determining, for each packet, whether a congestion condition exists on the egress node, and processing the packets such that packets associated with egress nodes for which the congestion condition does not exist have a different queuing priority within the load-balancing network than packets associated with egress nodes for which the congestion condition exists. In one embodiment, packets associated with egress nodes for which the congestion condition exists may be dropped at the ingress node.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention controls queuing priority of packets traversing a load-balancing network. The present invention uses egress node information and egress node congestion information for controlling queuing priority of packets traversing a load-balancing network. The present invention modifies the queuing priority of packets on ingress nodes of the load-balancing network by which the packets enter the load-balancing network. The present invention utilizes the egress node information and egress node congestion information associated with each packet for determining whether to process the packet for modifying the queuing priority of the packet (or for dropping the packet at the ingress node). The present invention utilizes the egress node information for determining egress node congestion information.

The packet egress node information identifies the egress node from which the packet is assigned to leave the load-balancing network (i.e., information typically used for switching packets from an intermediate node to an egress node in a second distribution round). The packet egress node information is determined from a switching component of the ingress node, where the switching component of the ingress node performs routing of packets to egress nodes in the second distribution round. The node congestion information is determined using information distributed by load-balancing nodes (e.g., messages indicating existence of a congestion condition on the load-balancing node).

The present invention processes packets destined for congested egress nodes. In one embodiment, the present invention drops packets destined for congested egress nodes. In one embodiment, the present invention marks packets destined for congested egress nodes such that marked packets are dropped with a higher probability than unmarked packets in response to a packet-drop condition. In one embodiment, dropping of marked packets may include preventing the marked packets from being admitted to the associated queue. The processing of packets destined for congested nodes enables enforcement of hose constraint requirements on egress traffic loads. By enforcing hose constraint requirements on egress traffic loads, the present invention prevents congestion due to hose constraint violations, thereby improving network performance.

Figure 1:
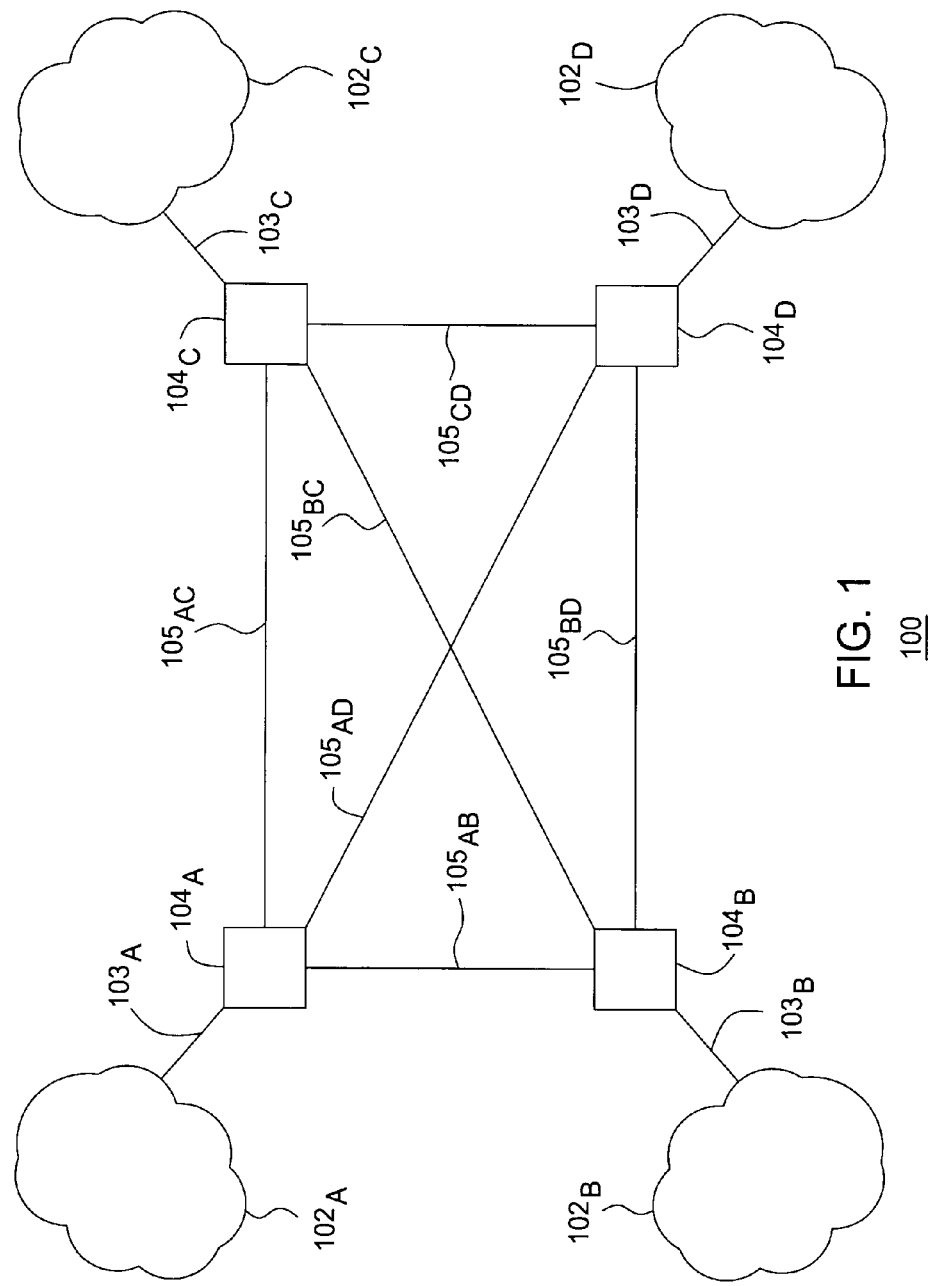
FIG. 1 depicts a high-level block diagram of a communication network.

FIG. 1 depicts a high-level block diagram of a communication network. As depicted in FIG. 1, communication network 100 includes a plurality of networks $102_A$, $102_B$, $102_C$, and $102_D$ (collectively, networks 102) and a plurality of nodes $104_A$, $104_B$, $104_C$, and $104_D$ (collectively, nodes 104). The networks $102_A$, $102_B$, $102_C$, and $102_D$ communicate with nodes $104_A$, $104_B$, $104_C$, and $104_D$, respectively, using a plurality of links $103_A$, $103_B$, $103_C$, and $103_D$ (collectively, links 103), respectively. In FIG. 1, nodes $104_A$ and $104_B$ communicate using a link $105_{AB}$, nodes $104_A$ and $104_C$ communicate using a link $105_{AC}$, nodes $104_A$ and $104_D$ communicate using a link $105_{AD}$, nodes $104_B$ and $104_C$ communicate using a link $105_{BC}$, nodes $104_B$ and $104_D$ communicate using a link $105_{BD}$, nodes $104_C$ and $104_D$ communicate using a link $105_{CD}$. The links $105_{AB}$, $105_{AC}$, $105_{AD}$, $105_{BC}$, $105_{BD}$, and $105_{CD}$ are collectively denoted as links 105. The nodes 104 and links 105 collectively form a load-balancing network.

As depicted in FIG. 1, networks 102 include communication networks operable for supporting any communications. In one embodiment, networks 102 include packet-based networks. In one such embodiment, networks 102 include at least one of Ethernet networks, Internet Protocol (IP) networks, Multi-protocol Label Switching (MPLS) networks, and the like, as well as various combinations thereof. As depicted in FIG. 1, nodes 104 include nodes operable for supporting any communications supported by networks. As such, networks 102 and associated nodes 104 are operable for supporting various communication traffic types such as Ethernet traffic, IP traffic, MPLS traffic, and the like, as well as various combinations thereof. As depicted in FIG. 1, networks 102 exchange traffic using a load-balancing network.

As depicted in FIG. 1, nodes 104, operating as load-balancing nodes for dynamically balancing traffic between networks, and associated links 105, collectively form a load-balancing network. For the load-balancing network, ingress traffic speeds entering the load-balancing network and egress traffic speeds leaving the load-balancing network are known, however, traffic within the load-balancing network (i.e., traffic exchanged between nodes 104 using links 105) is unknown. Since the load-balancing network distributes traffic load entering the load-balancing network from networks substantially equally over nodes 104, all possible traffic matrices may be supported.

As depicted in FIG. 1, nodes 104 operate as ingress nodes, intermediate nodes, and egress nodes. For traffic entering the load-balancing network from networks, associated nodes 104 operate as ingress nodes. For traffic leaving the load-balancing network toward networks, associated nodes 104 operate as egress nodes. For traffic traversing the load-balancing network (i.e., from ingress node to egress node), nodes 104 operate as intermediate nodes. In one embodiment, traffic routing within the load-balancing network (i.e., between networks) is performed according to distribution rounds. In one such embodiment, traffic routing between an ingress node (illustratively, one of the nodes 104) and an egress node (illustratively, one of the nodes 104) is performed using two traffic distribution rounds.

In a first distribution round, at each node 104, packets entering the load-balancing network from associated networks 102 are evenly distributed to each of the nodes 104. For example, incoming packets originating from network $102_A$ (and destined for network $102_B$) are evenly distributed by node $104_A$ to each of nodes $104_A$, $104_B$, $104_C$, and $104_D$. In a second distribution round, at each node 104, packets received during the first distribution round are forwarded to nodes 104 according to the networks 102 for which each packet is destined. For example, packets entering the load-balancing network at node $104_A$ and destined for network $102_B$, after being evenly distributed by node $104_A$ to nodes $104_A$, $104_B$, $104_C$, and $104_D$ in the first distribution round, are routed from nodes $104_A$, $104_B$, $104_C$, and $104_D$ to node $104_B$ in the second distribution round.

Although depicted and described herein as dynamically balancing traffic between a specific number of networks, a load-balancing network may dynamically balance traffic between fewer or more networks. Although depicted and described herein as having a specific configuration, a load-balancing network may be implemented using fewer or more load-balancing nodes, as well as a different load-balancing node configuration. Although, for purposes of clarity, each link 103 and link 105 is depicted using a single physical link, each link may 103 and link 105 may include a plurality of physical links.

Figure 2:
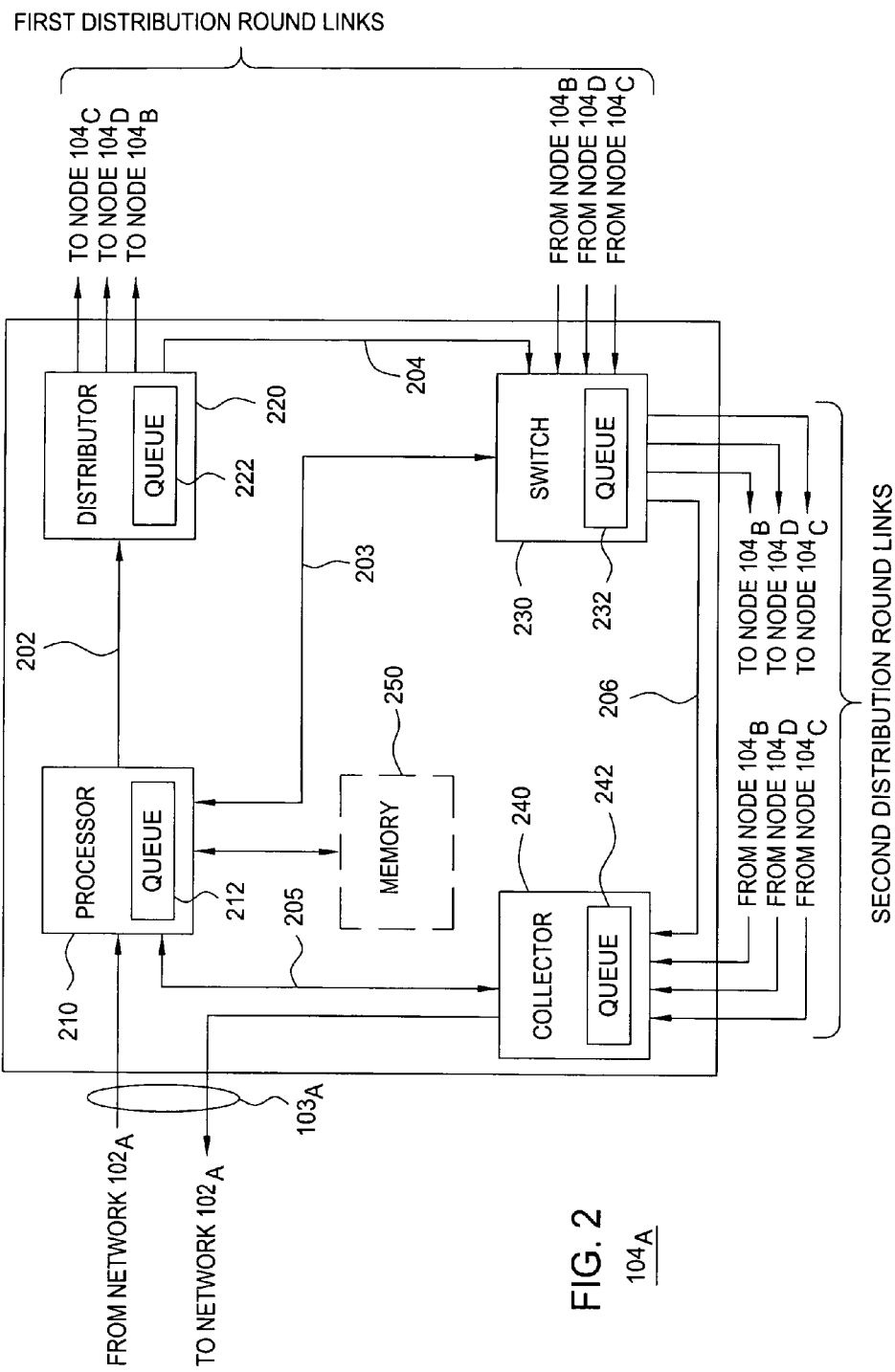
FIG. 2 depicts a high-level block diagram of a load-balancing node of the communication network of FIG. 1.

FIG. 2 depicts a high-level block diagram of a load-balancing node of the communication network of FIG. 1 (illustratively, node $104_A$). As depicted in FIG. 2, node $104_A$ includes a processor 210, a distributor 220, a switch 230, and a collector 240. The processor 210 includes a processor queue 212. The distributor 220 includes a distributor queue 222. The switch 230 includes a switch queue 232. The collector 240 includes a collector queue 242. In one embodiment, node $104_A$ optionally includes a memory 250 associated with processor 210. Although not depicted, node $104_A$ may include various other input modules, output modules, processor modules, memory modules, support circuits, and the like, as well as various combinations thereof.

As depicted in FIG. 2, processor 210 is coupled to network $102_A$ via link $103_A$, and to distributor 220 via an internal link 202. The distributor 220 is coupled to nodes $104_B$, $104_C$, and $104_D$ via links $105_{AB}$, $105_{AC}$, and $105_{AD}$, and to switch 230 via an internal link 204. The switch 230 is coupled to nodes $104_B$, $104_C$, and $104_D$ via links $105_{AB}$, $105_{AC}$, and $105_{AD}$, and to distributor 240 via a link 206. The collector 240 is coupled to nodes $104_B$, $104_C$, and $104_D$ via links $105_{AB}$, $105_{AC}$, and $105_{AD}$, and to network $102_A$ via link $103_A$. The processor 210 and switch 230 communicate using an internal link 203. The processor 210 and collector 240 communicate using an internal link 205. For purposes of clarity in discussing functions associated with processor 210, distributor 220, switch 230, and collector 240 with respect to traffic distribution rounds, links $105_{AB}$, $105_{AC}$, and $105_{AD}$ are logically depicted and described herein with respect to FIG. 2.

As depicted in FIG. 2, processor 210 receives traffic (e.g., a traffic flow of packets) from network $102_A$ via link $103_A$. The received traffic may be destined for any of networks. For each packet received by processor 210, processor 210 determines whether to modify a queuing priority associated with the packet. In one embodiment, the determination as to whether to modify the queuing priority of a packet is determined using an egress node congestion status associated with the egress node through which the packet is assigned to leave the load-balancing network.

In one embodiment, processor 210 queries switch 230 in order to determine the egress node of the packet (i.e., one of nodes 104 through which the packet is assigned to leave the load-balancing network). In one embodiment, processor 210 queries one or more routing tables associated with switch 230 for determining the egress node associated with each packet received by processor 210. Using the identified egress node associated with the packet, processor 210 determines the egress node congestion status associated with the identified egress node. In one embodiment, the egress node congestion status provides an indication as to whether the egress node currently has a congestion condition (i.e., whether the egress node is currently congested).

In one embodiment, if the egress node of a packet does not have a congestion condition, processor 210 forwards the packet to distributor 220 (i.e., packet passes through processor 210 without any additional processing). The unprocessed packets may be referred to herein as unmarked packets. In one embodiment, if the egress node of a packet does have a congestion condition, processor 210 processes the packet. In one such embodiment, processor 210 may drop the packet in response to a determination that the egress node of the packet has a congestion condition. In another such embodiment, processor 210 may process the packet in a manner for modifying a queuing priority associated with the packet (e.g., marking the packet as having a particular queuing priority). The processor 210 then forwards the marked packet to distributor 220.

In one embodiment, congestion condition information is stored by node $104_A$ (as well as each of nodes $104_B$, $104_C$, and $104_D$). In one embodiment, congestion condition information is stored by processor 210. In one such embodiment, processor 210 retrieves congestion condition information for determining whether to process packets for modifying the queuing priority of the packets. In one embodiment, congestion condition information is stored by one or more other components of node $104_A$ (e.g., distributor 220, switch 230, collector 240, memory 250, and the like). In one such embodiment, processor 210 retrieves congestion condition information from another module (e.g., memory 250, distributor 220, switch 230, collector 240, and the like).

In one embodiment, congestion condition information includes one or more indicators for identifying which nodes 104 have associated congestion conditions. In one embodiment, a congestion condition associated with a node is indicative of a queue overflow condition (or any other queue utilization condition) associated with one of the queues of the node (e.g., associated with a processor queue, a distributor queue, a switch queue, a collector queue, and the like, as well as various other queues or memory devices associated with the node, as well as various combinations thereof). In one embodiment, a congestion condition is indicative of a hose constraint violation associated with the load-balancing node from which the congestion condition is received.

In one embodiment, congestion condition information stored by node $104_A$ is generated by at least one of nodes 104. In one such embodiment, congestion condition information may be generated by one or more of the processors, distributors, switches, and collectors of one or more of the nodes 104, or various other components associated with processors, distributors, switches, collectors of one or more of the nodes 104, and the like, as well as various combinations thereof. In one embodiment, congestion condition information may be conveyed using one or more congestion condition messages generated by one or more of the processors, distributors, switches, and collectors of one or more of the nodes 104, or various other components associated with processors, distributors, switches, collectors of one or more of the nodes 104, and the like, as well as various combinations thereof.

In one embodiment, upon detection of a congestion condition by any of processor 210, distributor 220, switch 230, or collector 240, the component detecting the congestion condition generates a plurality of congestion condition messages for distribution to nodes 104 (including processor 210 of node $104_A$). In one embodiment, in which switch 230 generates the congestion condition messages in response to a congestion condition, switch 230 may distribute the congestion condition messages to nodes 104. In one embodiment, in which collector 240 generates the congestion condition messages in response to a congestion condition, collector 240 may provide the congestion condition messages to at least one of processor 210, distributor 220, or switch 230 for distribution of the congestion condition messages to nodes 104.

In one embodiment, upon detection of a congestion condition by any of distributor 220, switch 230, or collector 240, or any other component of the load-balancing node, the component detecting the congestion condition notifies processor 210 of the detected congestion condition. In this embodiment, processor 210 may generate a plurality of congestion condition messages for distribution to nodes 104 (including processor 210 of node $104_A$, as well as similar processors associated with nodes $104_B$, $104_C$, and $104_D$). In this embodiment, processor 210 may forward the generated congestion condition messages to at least one of distributor 220 or switch 230, as well as like components adapted for communicating with nodes 104, for distribution of the congestion condition messages to nodes 104.

For example, in one embodiment, upon detection of a queue overflow condition (or any other queue utilization condition) associated with any of distributor queue 222, switch queue 232, or collector queue 242 (by any of distributor 220, switch 230, and collector 240, respectively) the component detecting the queue overflow condition (or other condition) may notify processor 210 of the queue overflow condition. In this embodiment, processor 210 may generate a congestion condition notification message for distribution (using distributor 220) to nodes $104_B$, $104_C$, and $104_D$. In this embodiment, processor 210 may also store the congestion condition locally for use by node $104_A$ in processing packets received from network $102_A$.

In this embodiment, in which processor 210 processes the packet in a manner for modifying the queuing priority associated with the packet, a portion of the packet header of the processed packet may be set for modifying the queuing priority of the packet. For example, a bit in the packet header may be changed (e.g., from a zero to a one). The processed packets may be referred to herein as marked packets. In this embodiment, the modified queuing priority may be utilized by other modules of the load-balancing network (e.g., the distributor of the ingress node, the switch of the intermediate node, and the collector of the egress node) for determining which packets to drop in response to a packet drop condition.

As depicted in FIG. 2, distributor 220 receives unmarked packets and marked packets from processor 210. The distributor 220 distributes packets (including unmarked packets and, possibly, marked packets) to nodes 104 of the load-balancing network. In one embodiment, distributor 220 distributes traffic to nodes 104 in a substantially equal manner such that each node 104 (including node $104_A$) receives substantially equal traffic flow portions (e.g., substantially equal traffic volume). In this embodiment, distributor 220 distributes traffic to nodes 104 independent of the node 104 by which the distributed packets leave the load-balancing network (i.e., independent of the egress node associated with the packet). As described herein, distributor 220 distributes packets to nodes 104 in a first traffic distribution round.

As described herein, in one embodiment, distributor 220 queues packets received from processor 210 prior to distribution of the packets in the first distribution round. In one such embodiment, in which distributor 220 receives packets from processor 210 at a rate faster than distributor 220 is distributing the received packets to nodes 104, utilization of distributor queue 222 increases. In this embodiment, depending upon such factors as the size of distributor queue 222, the length of time for which distributor traffic ingress rate exceeds distributor traffic egress rate, and like factors, distributor queue 222 may reach a queue overflow condition in which distributor 220 begins dropping packets from distributor queue 222.

In one embodiment, distributor 220 drops marked packets destined for congested egress nodes with a higher probability than distributor 220 drops unmarked packets destined for uncongested egress nodes. In one such embodiment, distributor 220 drops marked packets before dropping unmarked packets (i.e., unmarked packets are only dropped if no marked packets are located in distributor queue 222). In one embodiment, distributor 220 may begin dropping unmarked packets if no marked packets are located in distributor queue 222. As such, depending upon utilization of distributor queue 222, distributor 220 distributes packets (including unmarked packets and, possibly, marked packets) to nodes 104 (including node $104_A$).

As depicted in FIG. 2, switch 230 receives packets from nodes 104 in the first distribution round and transmits packets to nodes 104 in a second distribution round. In a first distribution round, switch 230 receives packets from nodes 104 (i.e., from distributor 220 of node $104_A$ via internal link 204, as well as from similar distributors associated with nodes $104_B$, $104_C$, and $104_D$ (not depicted) via associated links $105_{AB}$, $105_{AC}$, and $105_{AD}$. The packets received by switch 230 are received independent of the associated egress nodes. In a second distribution round, switch 230 transits packets towards nodes 104 (i.e., toward collector 240 of node $104_A$ via internal link 206, as well as toward similar collectors associated with nodes $104_B$, $104_C$, and $104_D$ (not depicted) via associated links $105_{AB}$, $105_{AC}$, and $105_{AD}$. The packets transmitted by switch 230 are transmitted according to the associated egress nodes.

As described herein, distribution rounds are associated with packets (not nodes). In other words, the first distribution round of a packet refers to transmission of the packet from a distributor of an ingress node to a switch of an intermediate node (and, similarly, receipt of the packet by the switch of the intermediate node), and the second distribution round of a packet refers to transmission of the packet from the switch of the intermediate node to a collector of an egress node (and, similarly, receipt of the packet by the collector of the egress node). As such, packets distributed by switch 230 in a current second distribution round include packets received by switch 230 in a previous first distribution round.

As described herein, switch 230 receives packets from nodes 104 in a first traffic distribution round. In one embodiment, switch 230 queues packets received from nodes 104 in the first distribution round in switch queue 232 prior to distribution of the packets to nodes 104 in the second distribution round. In one such embodiment, in which switch 230 receives packets from nodes 104 at a rate faster than switch 230 is transmitting the received packets to nodes 104, utilization of switch queue 232 increases. In this embodiment, depending upon such factors as the size of switch queue 222, the length of time for which switch traffic ingress rate exceeds switch traffic egress rate, and like factors, switch queue 222 may reach a queue overflow condition in which switch 230 begins dropping packets from switch queue 232.

In one embodiment, switch 230 drops marked packets destined for congested nodes with a higher probability than switch 230 drops unmarked packets destined for uncongested nodes. In one such embodiment, switch 230 drops marked packets before dropping unmarked packets (i.e., unmarked packets are only dropped if no marked packets are located in switch queue 232). In one embodiment, switch 230 may begin dropping unmarked packets if no marked packets are located in switch queue 232. As such, depending upon utilization of switch queue 232, switch 232 distributes packets (including unmarked packets and, possibly, marked packets), to nodes 104 (including node $104_A$).

As described herein, switch 230 transmits packets to nodes 104 in a second traffic distribution round. In one embodiment, unlike distributor 220 which distributes packets to nodes 104 independent of the egress nodes associated with the packets, switch 230 transmits packets to nodes 104 according to the egress nodes associated with the packets. In other words, switch 230 performs packet switching for routing packets received from distributors of ingress nodes (by which the packets entered the load-balancing network) to collectors of egress nodes (by which the packets are assigned to leave the load-balancing network). In one such embodiment, switch 230 queries at least one switching table for each packet received in the first distribution round for determining the egress node associated with each received packet.

As depicted in FIG. 2, collector 240 receives packets in the second distribution round. In particular, in the second distribution round, collector 240 receives packets from nodes 104 (i.e., from switch 230 of node $104_A$ via internal link 206, as well as from similar switches associated with nodes $104_B$, $104_C$, and $104_D$ (not depicted) via associated links $105_{AB}$, $105_{AC}$, and $105_{AD}$). As depicted in FIG. 2, collector 240 forwards received packets toward network $102_A$ using associated link $103_A$. As such, for packets received by associated collectors (illustratively, collector 240 of node $104_A$), nodes 104 operate as egress nodes of the load-balancing network.

In one embodiment, collector 240 queues packets received from nodes 104 in collector queue 242 prior to forwarding of the packets toward network $102_A$. In one such embodiment, in which collector 240 receives packets from nodes 104 at a rate faster than collector 240 is forwarding the received packets toward network $102_A$, utilization of collector queue 242 increases. In this embodiment, depending upon such factors as the size of collector queue 242, the length of time for which collector traffic ingress rate exceeds collector traffic egress rate, and like factors, collector queue 242 may reach a queue overflow condition in which collector 240 begins dropping packets from collector queue 242.

In one embodiment, collector 240 drops marked packets with a higher probability than collector 240 drops unmarked packets. In one such embodiment, collector 240 drops marked packets before dropping unmarked packets (i.e., unmarked packets are only dropped if no marked packets are located in collector queue 242). In one embodiment, collector 240 may begin dropping unmarked packets if no marked packets are located in collector queue 242. As such, depending upon utilization of collector queue 242, collector 240 forwards packets (including unmarked packets and, possibly, marked packets), toward network 102$_A$ (via link 103$_A$).

Although depicted and described as comprising individual components, in one embodiment, processor 210, distributor 220, switch 230, and collector 240 may be combined into fewer functional components or distributed across more functional components. Furthermore, the various functions of processor 210, distributor 220, switch 230, and collector 240 may be distributed across the functional components, as well as various other functional components, in a different manner. Furthermore, although depicted and described herein as comprising individual memory components associated with processor 210, distributor 220, switch 230, and collector 240, in one embodiment, one or more of processor queue 212, distributor queue 222, switch queue 232, and collector queue 242 may be implemented in one or more node-level memory components of node 104$_A$ (e.g., memory 250).

Figure 3:
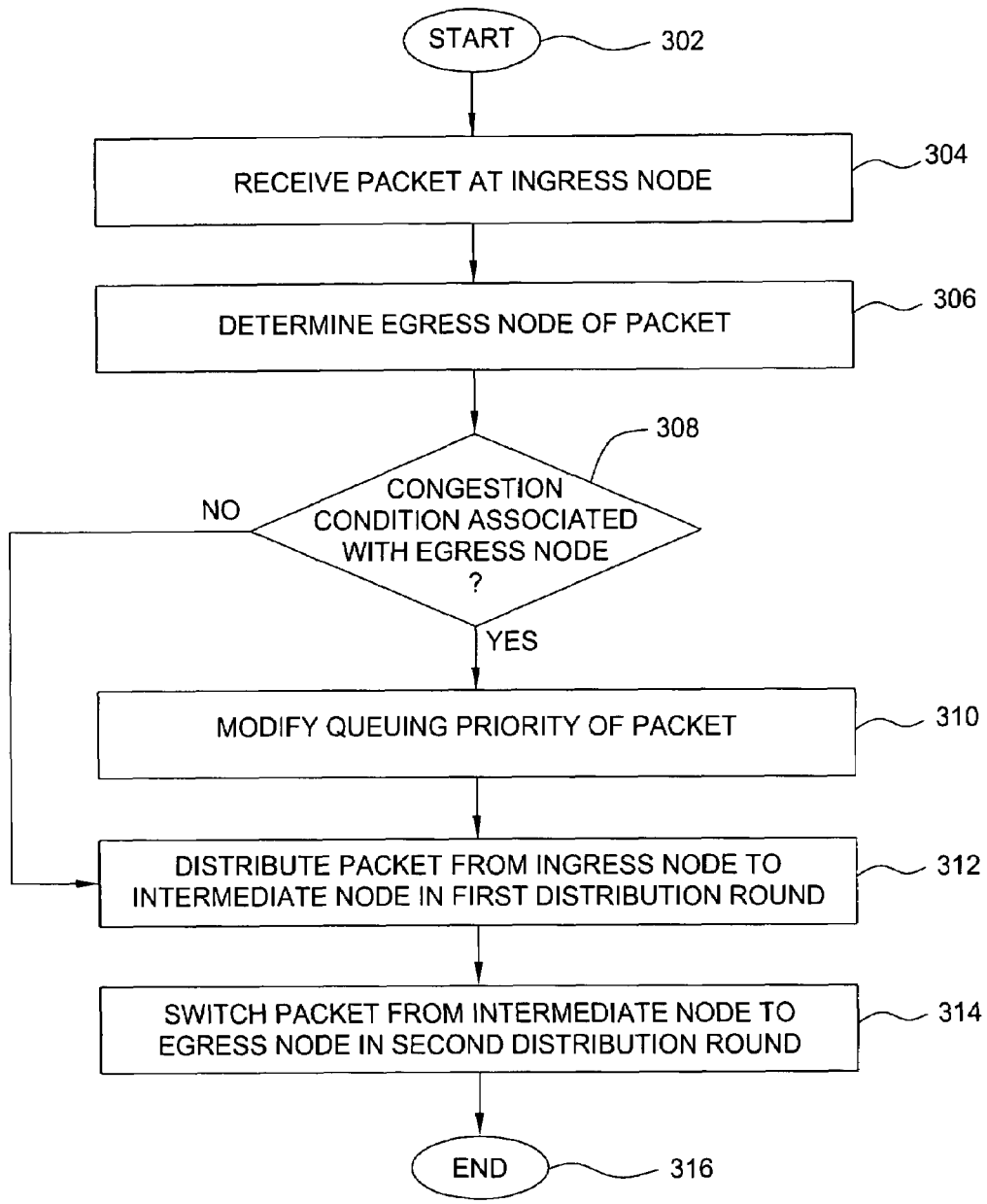
FIG. 3 depicts a method according to one embodiment of the present invention.

FIG. 3 depicts a method according to one embodiment of the present invention. In general, method 300 of FIG. 3 includes a method for enforcing hose constraint requirements on egress traffic of a load-balancing network. In particular, method 300 of FIG. 3 includes a method for processing a packet for modifying a queuing priority associated with the packet in response to a determination that the packet is assigned to leave the load-balancing network through an egress node having an associated congestion condition. Although depicted as being performed serially, those skilled in the art will appreciate that at least a portion of the steps of method 300 may be performed contemporaneously, or in a different order than presented in FIG. 3. The method 300 begins at step 302 and proceeds to step 304.

At step 304, a packet is received at an ingress node. At step 306, an egress node associated with the packet is determined. In one embodiment, the egress node associated with a packet is determined from a switching module of the ingress node (illustratively, switch 230 of FIG. 2). At step 308, a determination is made, using an egress node congestion status associated with the identified egress node, as to whether the egress node has an associated congestion condition. In one embodiment, the congestion status of the egress node associated with a packet is determined from a processor module of the ingress node (illustratively, processor 210 of FIG. 2). If the egress node does not have an associated congestion condition, method 300 proceeds to step 312 (skipping step 310). If the egress node does have an associated congestion condition, method 300 proceeds to step 310. At step 310, the packet is processed for modifying the queuing priority associated with the packet. In other words, the packet is marked for identifying the packet as a packet destined for a congested egress node.

In one embodiment, packets associated with egress nodes for which congestion conditions exist (i.e., congested egress nodes) are marked such that packets associated with congested egress nodes have a different queuing priority than packets associated with egress nodes for which congestion conditions do not exist (i.e., uncongested egress nodes). In one such embodiment, packets associated with congested egress nodes are marked such that packets associated with congested egress nodes have a lower queuing priority than packets associated with uncongested egress nodes (e.g., marked packets associated with congested egress nodes are dropped before unmarked packets associated with uncongested egress nodes). In one embodiment, packets are marked using one or more bits of the associated packet header.

At step 312, the packet is distributed (along with other traffic) from the ingress node to an intermediate node in a first distribution round (associated with the packet). Since many packets undergo processing as described in steps 302-308, many unmarked packets as well as marked packets may be distributed in the first distribution round. At step 314, the packet is switched (along with other traffic) from the intermediate node to the egress node in a second distribution round (associated with the packet). Since many packets undergo processing as described in steps 302-308, many unmarked packets as well as marked packets may be switched in the second distribution round. The method 300 then proceeds to step 316, where method 300 ends.

As described herein with respect to FIG. 2, packets may traverse various queues (e.g., processor queue of ingress node, distributor queue of ingress node, switch queue of intermediate node (where the intermediate node may also be the ingress node or the egress node), and collector queue of egress node) during various different distribution rounds as the packets traverse the load-balancing network. Furthermore, as described herein with respect to FIG. 2, different distribution rounds (e.g., first distribution round versus second distribution round) associated with different packets may occur contemporaneously. As such, for purposes of clarity, various embodiments of the present invention are depicted and described in more detail with respect to node 104$_A$ of FIG. 2.

Figure 4:
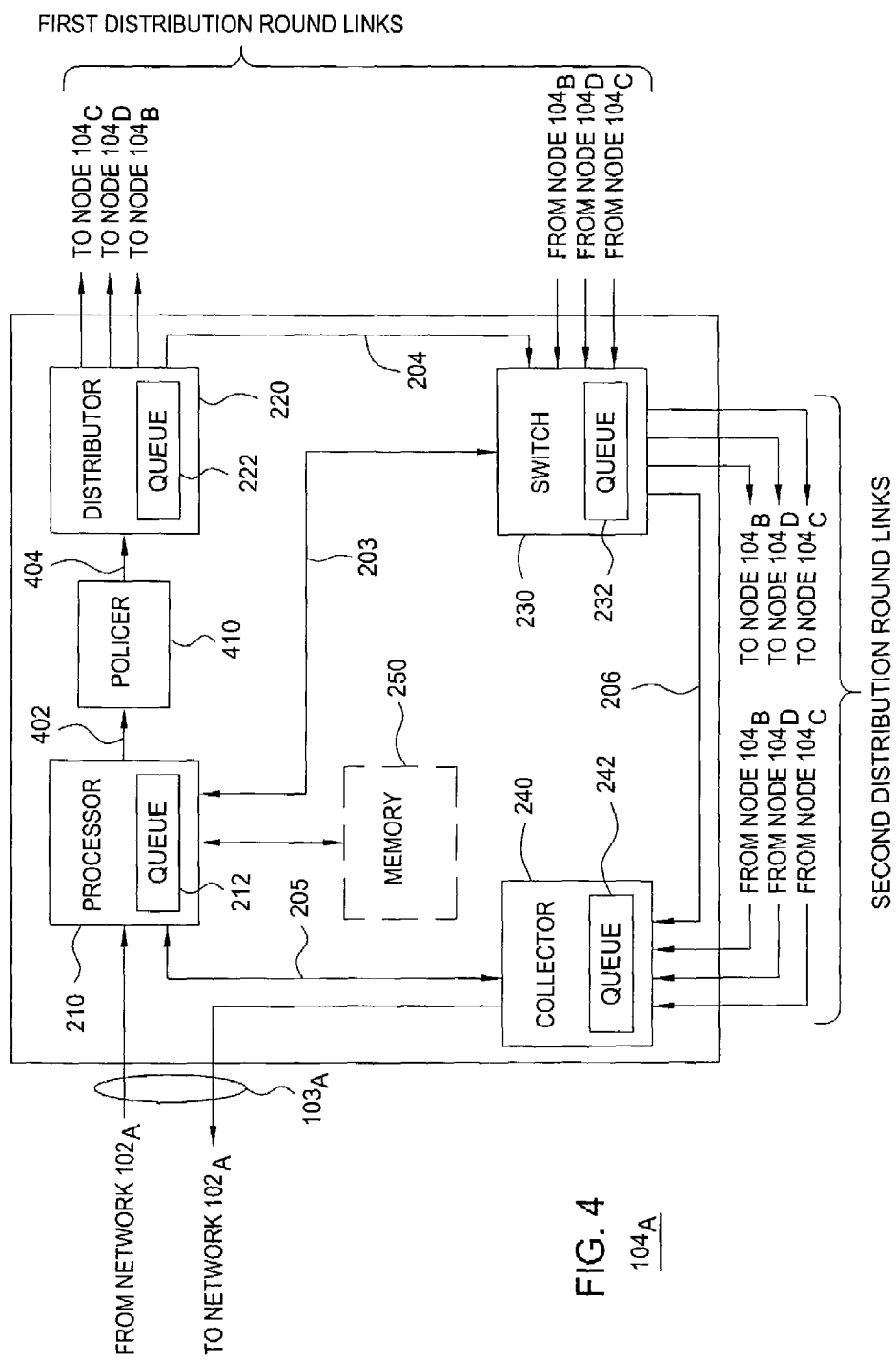
FIG. 4 depicts a high-level block diagram of a load-balancing node of the communication network of FIG. 1.

FIG. 4 depicts a high-level block diagram of a load-balancing node of the communication network of FIG. 1 (illustratively, node 104$_A$). In general, as depicted in FIG. 4, node 104$_A$ includes each of the components of node 104$_A$ depicted and described herein with respect to FIG. 2. Specifically, as depicted in FIG. 4, node 104$_A$ includes a different embodiment of node 104$_A$ depicted and described herein with respect to FIG. 2 in which a policer 410 is disposed between processor 210 and distributor 220. As depicted in FIG. 4, the output of processor 210 is coupled to the input of policer 410 using a communication link 402, and the output of policer 410 is coupled to the input of distributor 220 using a communication link 404.

As depicted in FIG. 4, policer 410 is adapted for policing the traffic rate associated with traffic provided from processor 210 to distributor 220. In one embodiment, policer 410 is adapted for performing at least a portion of the functions of processor 210. In one embodiment, policer 410 may be adapted for dropping at least a portion of the packets received from processor 210. In one embodiment, policer 410 may be adapted for processing packets received from processor 210. In one such embodiment, policer 410 may process the packet in a manner for modifying a queuing priority associated with the packet (e.g., marking the packet as having a particular queuing priority). The policer 410 may then forward the marked packet to distributor 220. In one embodiment, policer 410 may perform various other packet policing functions.

In one embodiment, policer 410 may be used for managing potential differences between ingress link speed and ingress hose constraint. For example, assuming an ingress link speed of 100 Mbps and an ingress hose constraint of 10 Mbps, policer 410 may be configured to prevent violation of the 10 Mbps ingress hose constraint. In one embodiment, policer 410 may be used for managing egress hose constraint violations. For example, if an egress hose constraint is violated, the excess traffic causing the egress hose constraint violation is dropped at the egress node, wasting bandwidth in the load-balancing network. In one embodiment of the present invention, a congestion notification message (i.e., backpressure message) notifies processor 210 to drop or process the packets destined for the congested egress node on which the egress hose constraint is violated. In one such embodiment, policer 410 may allow packets other than packets destined for the congested egress node to pass through to the distributor 220, thereby ensuring utilization of the previously wasted bandwidth.

Figure 5:
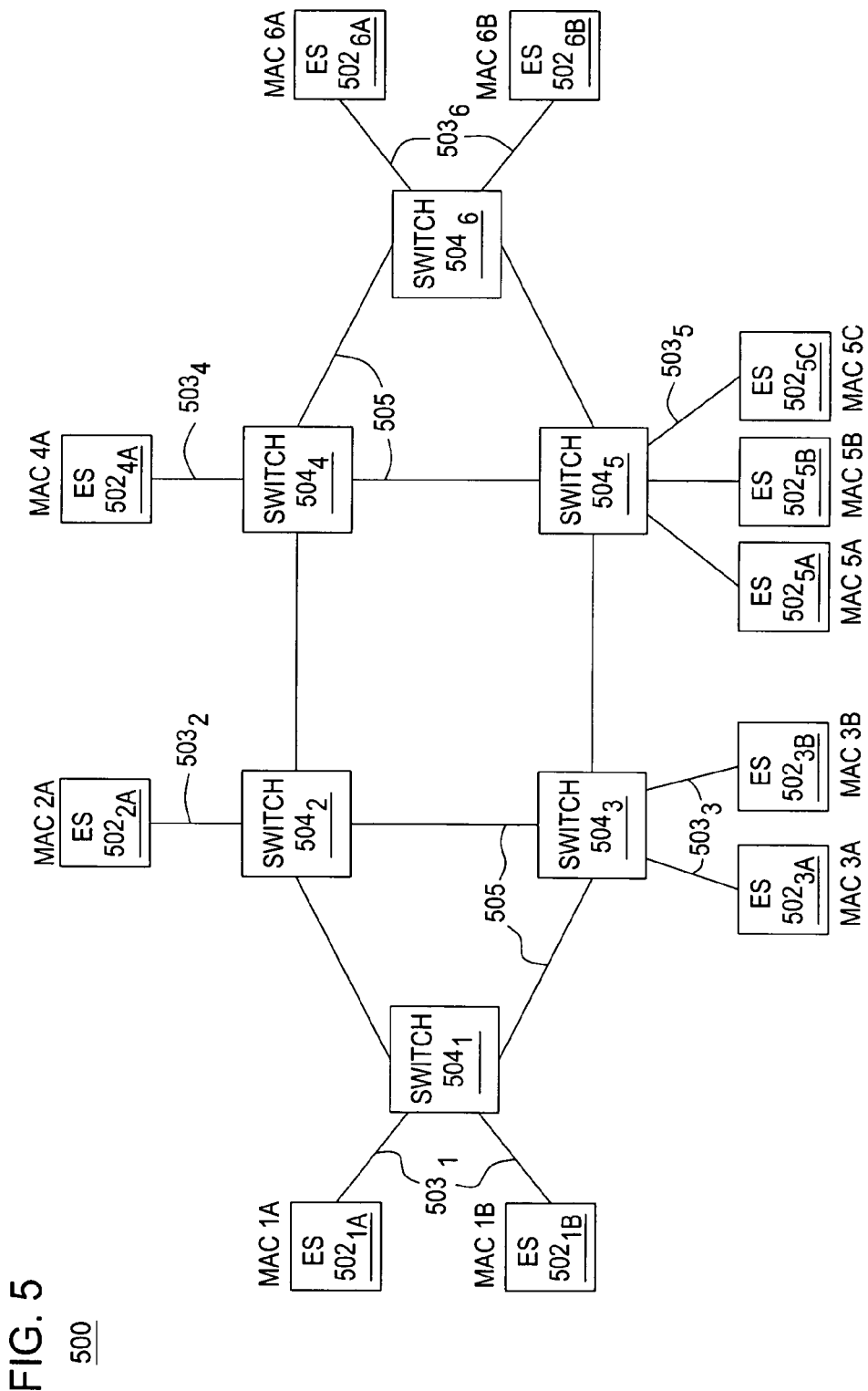
FIG. 5 depicts a high-level block diagram of a communication network.

Although primarily depicted and described herein with respect to a specific load-balancing network, the congestion prevention methodologies of the present invention may be implemented using various other load-balancing network. In one embodiment, the congestion prevention methodologies of the present invention may be implemented using an Ethernet load-balancing network. An Ethernet load-balancing network including the present invention is depicted and described herein with respect to FIG. 5. A methodology for congestion prevention within the Ethernet load-balancing network of FIG. 5 is depicted and described herein with respect to FIG. 6. Furthermore, various other load-balancing networks may be adapted for using egress congestion prevention methodologies of the present invention.

FIG. 5 depicts a high-level block diagram of a communication network. As depicted in FIG. 5, communication network 500 is an Ethernet network. Specifically, communication network 500 of FIG. 5 includes a plurality of switches $504_1$-$504_6$ (collectively, switches 504) in communication using a plurality of core communication links (CCLs) 505 (collectively, CCLs 505). As depicted in FIG. 5, each of the switches 504 operates as a network access point for at least one associated end station (ES), where end stations include computers, printers, and the like, as well as various combinations thereof. As depicted in FIG. 5, switches 504 may collectively operate as a load-balancing network.

As depicted in FIG. 5, switch $504_1$ communicates with a plurality of ESs $502_{1A}$-$502_{1B}$ (collectively, ESs $502_1$) using respective ACLs $503_1$, switch $504_2$ communicates with ES $502_{2A}$ using respective ACL $503_2$, switch $504_3$ communicates with a plurality of ESs $502_{3A}$-$502_{3B}$ (collectively, ESs $502_3$) using respective ACLs $503_3$, switch $504_4$ communicates with ES $502_{4A}$ using respective ACL $503_4$, switch $504_5$ communicates with a plurality of ESs $502_{5A}$-$502_{5C}$ (collectively, ESs $502_5$) using respective ACLs $503_5$, and switch $504_6$ communicates with a plurality of ESs $502_{6A}$-$502_{6B}$ (collectively, ESs $502_6$) using respective ACLs $503_6$. The ESs $502_1$-$502_6$ are collectively denoted as ESs 502.

As depicted in FIG. 5, Ethernet communication network 500 of FIG. 5 may be implemented using any Ethernet-based network elements, functions, and protocols, as well as any Ethernet load-balancing schemes, and the like, as well as various combinations thereof. As depicted in FIG. 5, each of the switches 504 operates as an ingress node (for traffic originating from ESs 502 connected to the switch 504), an intermediate node (for traffic originating from or terminating on ESs connected to other switches 504), and an egress node (for traffic terminating on an ES connected to the switch 504). In order to perform egress congestion prevention processing, each of the switches 504 must determine the ESs for which every other switch 504 operates as an egress node.

In one embodiment, since a switch process 230 in a switch 504 may be a normal Ethernet switch process, at least a portion of the switches 504 may perform normal Ethernet learning and forwarding rules. In one embodiment, each of the links 105 between nodes 104, as depicted and described herein with respect to FIG. 1, may be a bidirectional link. In one such embodiment, for each frame received on a link 105, the receiving node 104 associates the source address of the incoming frame with the link 105 on which the frame is received. The source address information for incoming frames is used to forward the frames. For each incoming frame, switch process 230 determines whether an association between the destination address of the incoming frame and the link exists. If the association does exist, the incoming frame is forwarded on the associated link. If the association does not exist, the frame is forwarded on every link except for the link on which the frame was received.

In another embodiment, if a switch 504 is unaware of ESs 502 associated with other switches 504 (i.e., each switch 504 only knows the ESs 502 to which it is directly connected), in one embodiment, each switch 504 must notify every other switch 504 of the ESs 502 for which that switch 504 operates as an egress node. In one embodiment, each switch 504 may notify every other switch 504 of the respective addresses of the ESs 502 for which that switch 504 operates as an egress node. In one such embodiment, each switch 504 may notify every other switch 504 of the respective Media Access Control (MAC) addresses of the ESs 502 for which that switch 504 operates as an egress node.

As depicted in FIG. 5, each of the ESs 502 includes an associated MAC address which, for purposes of clarity, is simplified to correspond to the identifier associated with each of the ESs 502 (e.g., ES $502_{1A}$ is denoted as having a MAC address MAC 1A). In one example, considering the exchange of the addresses for which each switch 504 operates as an egress node from the perspective of switch $504_1$, switch $504_1$ may periodically receive address messages from each of switches $504_2$-$504_6$. In this example, each address message may include a list of addresses (e.g., MAC addresses) for which that switch 504 operates as an egress node. Using the information from the address message, switch $504_1$, may maintain a local table including the relationships depicted in Table 1.

TABLE 1

| Switch | Addresses |
|---|---|
| $504_2$ | MAC 2A |
| $504_3$ | MAC 3A, MAC 3B |
| $504_4$ | MAC 4A |
| $504_5$ | MAC 5A, MAC 5B, MAC 5C |
| $504_6$ | MAC 6A, MAC 6B |

In one embodiment, using the addresses of ESs 502 for which each switch 504 operates as an egress switch, the present invention controls queuing priority of packets traversing the Ethernet load-balancing network. As depicted in FIG. 5, each switch 504 uses egress switch address information, as well as egress switch congestion information, for controlling the queuing priority of packets traversing the load-balancing network. As described herein, in one embodiment, switches 504 operating as ingress switches utilize the egress switch address information and egress node congestion information associated with each packet for determining whether to process the packet for modifying the queuing priority of the packet (or for dropping the packet at the ingress node), as depicted and described herein with respect to FIG. 6.

Figure 6:
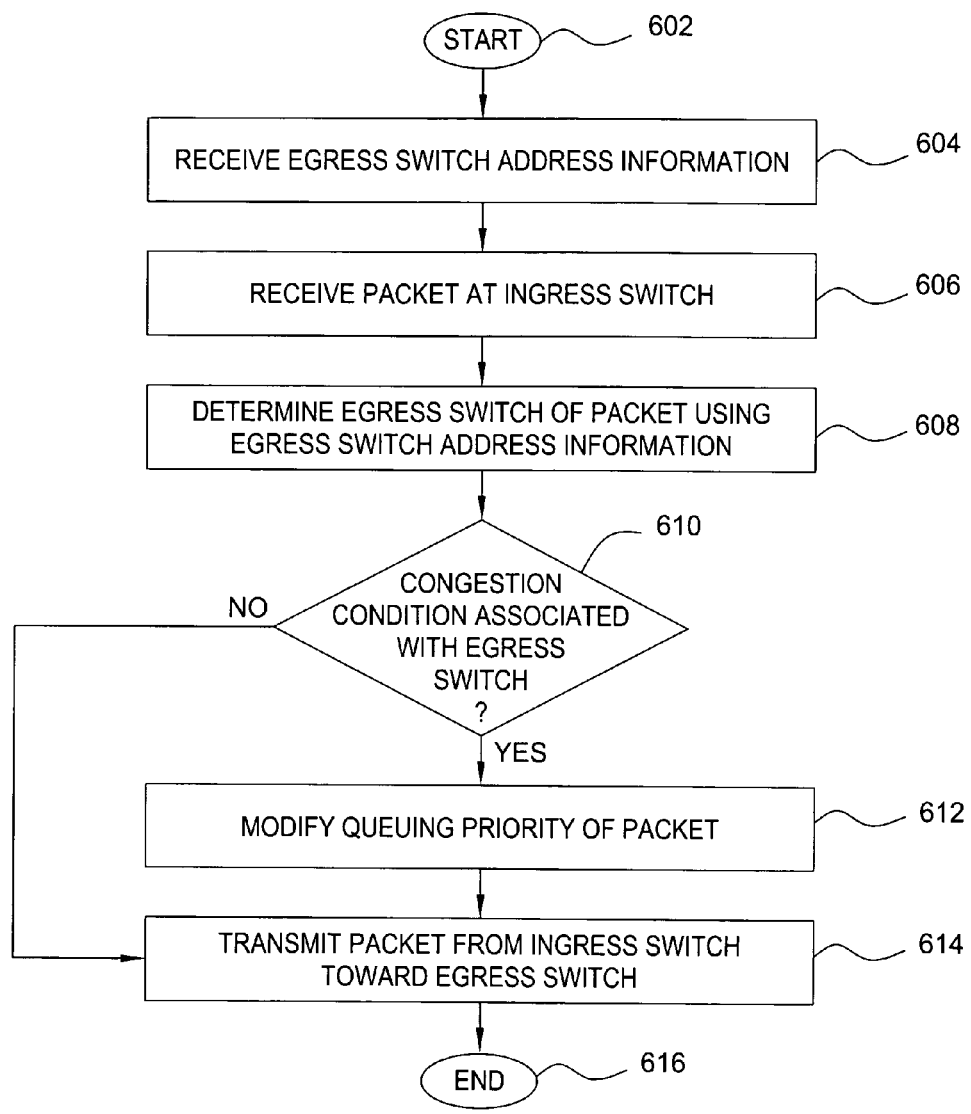
FIG. 6 depicts a method according to one embodiment of the present invention.

FIG. 6 depicts a method according to one embodiment of the present invention. In general, method 600 of FIG. 6 includes a method for preventing congestion on egress switches of a load-balancing network. In particular, method 600 of FIG. 6 includes a method for processing a packet for modifying a queuing priority associated with the packet in response to a determination that the packet is assigned to leave the load-balancing network through an egress switch having an associated congestion condition. Although depicted as being performed serially, those skilled in the art will appreciate that at least a portion of the steps of method 600 may be performed contemporaneously, or in a different order than presented in FIG. 6. The method 600 begins at step 602 and proceeds to step 604.

At step 604, egress switch address information is received. In one embodiment, the received egress switch address information is adapted for use in determining the ESs for which every other switch in the load-balancing network operates as an egress node. In one such embodiment, the received egress switch address information includes, for every other switch in the load-balancing network, MAC addresses of the network components for which each switch operates as an egress switch. For example, switch $504_1$ receives egress switch address information including associations of switches to MAC addresses of associated ESs, as depicted and described herein with respect to Table 1.

At step 606, a packet is received at an ingress switch. For example, switch $504_1$ receives a packet from ES $502_{1A}$. At step 608, an egress switch associated with the packet is determined. In one embodiment, the egress switch associated with the packet is determined using the egress switch address information. For example, the packet received by switch $504_1$ from ES $502_{1A}$ may include within the packet header a destination MAC address indicative that the packet is destined for ES $502_{5C}$ (i.e., destination MAC address is MAC 5C). In this example, switch $504_1$ may search the egress switch address information using MAC address MAC 5C in order to identify the switch to which ES $502_{5C}$ is connected (illustratively, switch $504_5$).

At step 610, a determination is made, using an egress switch congestion status associated with the identified egress switch, as to whether the egress switch has an associated congestion condition. The congestion status of the egress switch may be determined as described herein with respect to FIG. 2 and FIG. 3. For example, in one embodiment, upon detecting a congestion condition, the switch on which the congestion condition occurs may signal every other switch in the network for informing the other switches of the network of the detected congestion condition. In one such embodiment, each switch in the network maintains a congestion status associated with every other switch in the network. If the egress switch does not have an associated congestion condition, method 600 proceeds to step 614 (skipping step 612). If the egress switch does have an associated congestion condition, method 600 proceeds to step 612.

At step 612, the packet is processed for modifying the queuing priority associated with the packet. In other words, the packet is marked for identifying the packet as a packet destined for a congested egress node. In one embodiment, packets associated with egress switches for which congestion conditions exist are marked such that packets associated with congested egress switches have a different queuing priority than packets associated with egress switches for which congestion conditions do not exist. In one embodiment, packets associated with congested egress switches are marked such that packets associated with congested egress switches have a lower queuing priority than packets associated with uncongested egress switches (e.g., marked packets associated with congested egress switches are dropped before unmarked packets associated with uncongested egress switches). In one embodiment, packets are marked using one or more bits of the associated packet header.

At step 614, the packet is transmitted from the ingress switch toward the egress switch. In one embodiment, transmission of the packet from the ingress switch to the egress switch (assuming the packet is not a packet having a lower queuing priority resulting in the packet being dropped while traversing the network) may be performed using one of a plurality of Ethernet load-balancing schemes (e.g., Ethernet Load Balancing (ELB), Multiprotocol Label Switching (MPLS) Load Balancing (MLB), and the like). For example, switch $504_1$ transmits the packet to switch $504_3$, which in turn transmits the packet to switch $504_5$ which operates as the egress switch for ES $502_{5C}$ for which the packet is destined. The switch $504_5$ transmits the packet to ES $502_{5C}$. The method 600 then proceeds to step 616, where method 600 ends.

Figure 7:
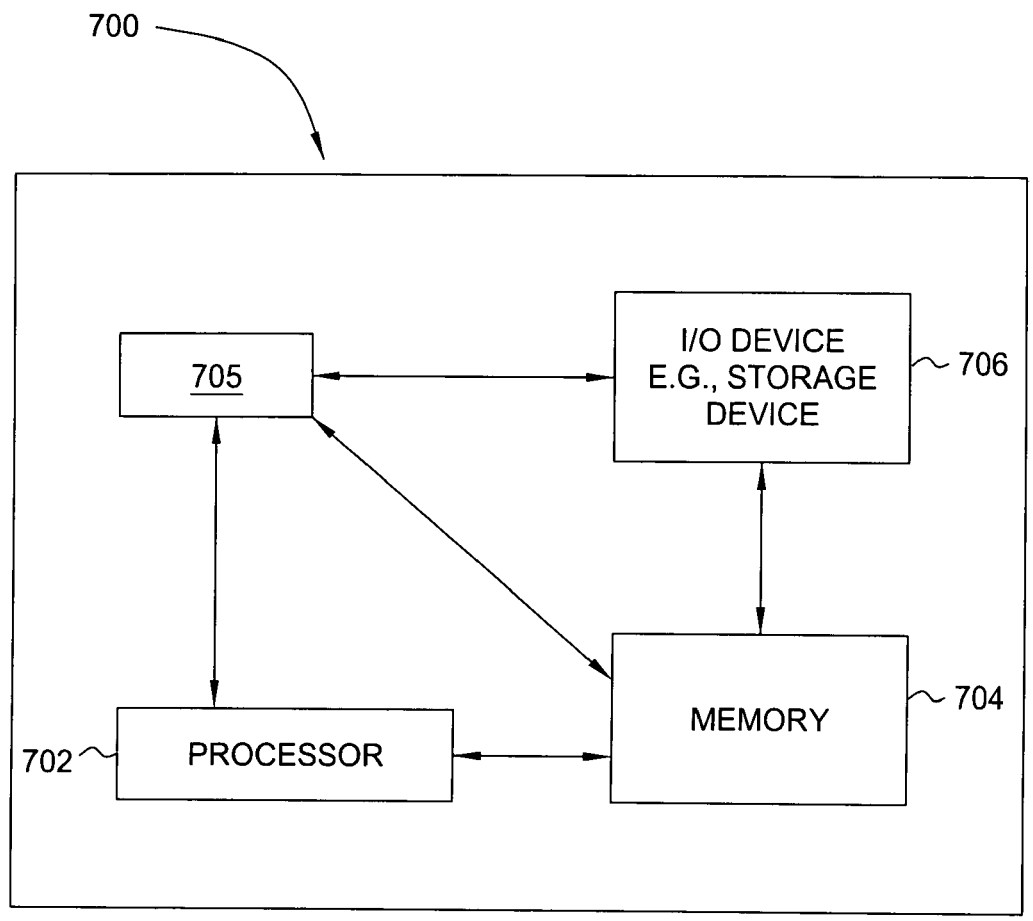
FIG. 7 depicts a high-level block diagram of a general-purpose computer suitable for use in performing the functions described herein.

FIG. 7 depicts a high-level block diagram of a general purpose computer suitable for use in performing the functions described herein. As depicted in FIG. 7, system 700 comprises a processor element 702 (e.g., a CPU), a memory 704, e.g., random access memory (RAM) and/or read only memory (ROM), a packet processing module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present packet processing module or process 705 can be loaded into memory 704 and executed by processor 702 to implement the functions as discussed above. As such, packet processing process 705 (including associated data structures) of the present invention can be stored on a computer readable medium or carrier, e.g., RAM memory, magnetic or optical drive or diskette and the like.

Although depicted and described herein with respect to a node $104_A$, nodes $104_B$, $104_C$, and $104_D$ operate in a manner substantially similar to the operation of node $104_A$. As such, nodes $104_B$, $104_C$, and $104_D$ perform processing for determining whether each packet entering the load-balancing network from networks $102_B$, $102_C$, and $102_D$, respectively, is processed in a manner for modifying queuing priorities of the packets in response to the existence of congestion conditions in the load-balancing network. As such, processors associated with any of nodes 104 may mark packets assigned to leave the load-balancing network via an egress node for which a congestion condition exists. Furthermore, components of any of the nodes 104 may drop packets, according to packet queuing priorities, in response to various conditions associated with components of any of nodes 104.

Although depicted and described herein with respect to a switch $504_1$, switches $504_2$-$504_6$ may operate in a manner substantially similar to the operation of switch $504_1$. As such, switches $504_2$-$504_6$ perform processing for determining whether each packet entering the load-balancing network from networks ESs $502_2$-$502_6$, respectively, is processed in a manner for modifying the queuing priority of the packet in response to the existence of congestion conditions in the load-balancing network. As such, processors associated with any of switches 504 may mark packets assigned to leave the load-balancing network via an egress node for which a congestion condition exists. Furthermore, various components of any of the switches 504 may drop packets, according to packet queuing priorities, in response to conditions associated with components of any of the switches 504.

Although primarily described herein with respect to standard traffic, in one embodiment, the present invention may be used for multicast traffic, broadcast traffic, and like traffic in which packets are replicated within the load-balancing network for providing the packet to multiple destinations. In this embodiment, replication of packets within the load-balancing network results in a situation in which total egress traffic leaving the load-balancing network is greater than total ingress traffic entering the load-balancing network, possibly leading to egress congestion. The present invention is operable for preventing this special case of egress hose constraint violation, as well as various other special cases of hose constraint violation.

Although primarily described herein with respect to queue overflow conditions, detection of congestion conditions, as well as the associated generation of congestion condition messages adapted for notifying load-balancing nodes of congestion conditions, may be performed in response to various other congestion conditions. In one embodiment, at least a portion of the components of nodes 104 may be configured with associated queue thresholds such that a congestion condition is detected in response to a determination that a queue threshold is satisfied. For example, in one embodiment, at least a portion of the components of nodes 104 (and, similarly, switches 504) may be configured such that if a queue associated with the component reaches 80% utilization, the component indicates detection of a congestion condition resulting in generation of associated congestion condition messages for distribution to nodes 104 (or switches 504) of the load-balancing network.

Although primarily described herein with respect to queue overflow conditions, dropping of packets by components of any of nodes 104 (or switches 504) may be performed in response to various other packet drop conditions (i.e., conditions causing one or more packets to be dropped). In one embodiment, at least a portion of the components of nodes 104 (or switches 504) may be configured with associated queue thresholds such that one or more packets are dropped in response to a determination that a queue threshold is satisfied. For example, in one embodiment, at least a portion of the components of nodes 104 (or switches 504) may be configured such that if a queue associated with the component reaches 90% utilization, the component begins dropping marked packets (and, if all marked packets have been dropped, unmarked packets) until the queue associated with the component drops below 90% utilization.

Although primarily described herein with respect to dropping of marked packets before any unmarked packets are dropped, in one embodiment, dropping of packets in response to various packet drop conditions may be performed using various other packet drop algorithms (i.e., algorithms for determining which packets are dropped in response to packet drop conditions). In one embodiment, for example, packets (including marked and unmarked) having one or more characteristics in common may be dropped before other packets (including marked and unmarked) are dropped. In one embodiment, for example, a ratio of marked packets to unmarked packets is defined such that, in response to detection of one or more packet drop conditions, marked packets and unmarked packets are dropped according to the defined packet drop ratio.

Although primarily described herein with respect to marking of packets in response to node congestion conditions, and dropping of marked packets with a higher probability than unmarked packets in response to packet drop conditions (e.g., queue overflow conditions), in one embodiment, the present invention may be used as a protection mechanism. In one such embodiment, in response to a failure of a link between nodes X and Y (e.g., failure of link $105_{AC}$ between nodes $104_A$ and $104_C$), one or both of the nodes between which the failed link is connected may generate and transmit a message (e.g., a link failure message) to each of the other load-balancing nodes in the load-balancing network.

In one such embodiment, upon receiving this message (or, optionally, two messages), each of the other load-balancing nodes may be adapted in a manner for preventing each of the other load-balancing nodes from sending packets to node X via node Y and to node Y via node X. In this embodiment, at least a portion of the ingress nodes has one less path on which traffic may be transmitted within the load-balancing network. In one embodiment, this reduction in the number paths available to ingress nodes may be accounted for during network provisioning of the load-balancing network. For example, by provisioning additional bandwidth for each path within the load-balancing network, all traffic within the load-balancing network may still be supported after such a link failure (or multiple such link failures, depending on the amount of additional bandwidth provisioned within the load-balancing network).

Although various embodiments which incorporate the teachings of the present invention have been shown and described in detail herein, those skilled in the art can readily devise many other varied embodiments that still incorporate these teachings.

What is claimed is:

1. A method for processing traffic in a load-balancing network comprising a plurality of nodes, comprising:
   determining an egress node associated with each of a plurality of packets of a traffic flow received at an ingress node adapted for splitting the traffic flow into a plurality of traffic flow portions independent of the egress node by which each packet is assigned to exit the load-balancing network;
   determining, for each packet, whether a congestion condition exists on the egress node; and
   processing the packets such that packets associated with egress nodes for which the congestion condition does not exist have a different queuing priority within the load-balancing network than packets associated with egress nodes for which the congestion condition exists.

2. The method of claim 1, wherein, for each of the plurality of packets, determining the egress node comprises:
   determining the egress node associated with the packet using switching information associated with the packet.

3. The method of claim 1, wherein, for each of the plurality of packets, determining the egress node comprises:
   determining a destination address associated with a destination of the packet; and
   determining the egress node associated with the packet using an association between the egress node and the destination address, the associated being received from the egress node.

4. The method of claim 1, wherein processing at least a portion of the packets comprises:
   dropping the packets associated with egress nodes for which the congestion condition exists.

5. The method of claim 1, wherein processing the packets comprises:
   assigning the packets associated with egress nodes for which the congestion condition exists a lower queuing priority within the load-balancing network than the packets associated with egress nodes for which the congestion condition does not exist.

6. The method of claim 5, wherein assigning the queuing priority comprises:

marking the packets associated with egress nodes for which the congestion condition exists to form marked packets; and allowing pass-through of packets associated with egress nodes for which the congestion condition does not exist to produce unmarked packets.

7. The method of claim 6, further comprising:

splitting the traffic flow comprising the unmarked packets and marked packets into a plurality of traffic flow parts associated with designated ones of the plurality of nodes; and distributing the traffic flow parts to the designated ones of the plurality of nodes in a first traffic distribution round;

wherein each of the designated nodes routes at least a portion of the received traffic flow part to one or more of the plurality of nodes in a second traffic distribution round;

wherein, in response to a determination that any of the traffic flow parts satisfies a queue threshold within the load-balancing network, dropping marked packets of the traffic flow parts with a higher probability than unmarked packets of the traffic flow parts.

8. The method of claim 6, further comprising:

conveying the traffic comprising marked packets and unmarked packets to a distributor module comprising a distributor queue having a distributor queue threshold; and in response to a determination that the distributor queue threshold is satisfied, dropping at least a portion of the traffic, wherein marked packets are dropped with a higher probability than unmarked packets.

9. The method of claim 8, further comprising:

distributing said traffic from the distributor module as first transmitted traffic in a first distribution round, the first transmitted traffic distributed to a local switching module and at least one remote switching module of respective at least one intermediate node;

receiving first received traffic at the local switching module in the first distribution round, the first received traffic including a portion of the first transmitted traffic and other first transmitted traffic received from at least one remote distributor module of respective at least one remote ingress node; and in response to a determination that the first received traffic violates a switching queue threshold, dropping at least a portion of the first received traffic, wherein marked packets are dropped with a higher probability than unmarked packets.

10. The method of claim 9, further comprising:

distributing second transmitted traffic from the local switching module in a second distribution round, the second transmitted traffic distributed to a local collector module and at least one remote collector module of respective at least one egress node;

receiving second received traffic at the local collector module in the second distribution round, the second received traffic including a portion of the second transmitted traffic and other second transmitted traffic received from at least one intermediate node; and in response to a determination that the second received traffic violates a collector queue threshold, dropping at least a portion of the second received traffic, wherein marked packets are dropped with a higher probability than unmarked packets.

11. The method of claim 6, further comprising:

splitting the traffic flow comprising the unmarked packets and marked packets into a plurality of traffic flow parts using an Ethernet load-balancing scheme; and distributing the traffic flow parts using the Ethernet load-balancing scheme.

12. An apparatus processing traffic in a load-balancing network comprising a plurality of nodes, comprising:

means for determining an egress node associated with each of a plurality of packets of a traffic flow received at an ingress node adapted for splitting the traffic flow into a plurality of traffic flow portions independent of the egress node by which each packet is assigned to exit the load-balancing network;

means for determining, for each packet, whether a congestion condition exists on the egress node; and means for processing the packets such that packets associated with egress nodes for which the congestion condition does not exist have a different queuing priority within the load-balancing network than packets associated with egress nodes for which the congestion condition exists.

13. An apparatus for routing traffic in a load-balancing network comprising a plurality of nodes, comprising:

a processor module for receiving a traffic flow comprising a plurality of packets; and a switching module coupled to the processor module, the switching module comprising egress node information adapted for determining an egress node associated with each of the plurality of packets;

wherein the processor module is adapted for:

determining, for each packet, using the egress node information from the switching module, the egress node associated with the packet, the egress node comprising an egress point by which the packet is assigned to exit the load-balancing network;

determining, for each packet, whether a congestion condition exists for the egress node; and processing the packets such that packets associated with egress nodes for which the congestion condition does not exist have a different queuing priority within the load-balancing network than packets associated with egress nodes for which the congestion condition exists.

14. The apparatus of claim 13, wherein the processor module is further adapted for processing the packets by performing:

dropping the packets associated with egress nodes for which the congestion condition exists.

15. The apparatus of claim 13, wherein the processor module is further adapted for processing the packets by:

assigning the packets associated with egress nodes for which the congestion condition exists a lower queuing priority within the load-balancing network than the packets associated with egress nodes for which the congestion condition does not exist.

16. The method of claim 15, wherein the processor module is further adapted for assigning the queuing priority by:

marking the packets associated with egress nodes for which the congestion condition exists to form marked packets; and allowing pass-through of packets associated with egress nodes for which the congestion condition does not exist to produce unmarked packets.

17. The apparatus of claim 15, further comprising a distributor module coupled to the processor module and the switching module, wherein the distributor module is adapted for:

splitting the traffic flow comprising the unmarked packets and marked packets into a plurality of traffic flow parts associated with designated ones of the plurality of nodes; and distributing the traffic flow parts to the designated ones of the plurality of nodes in a first traffic distribution round;

wherein each of the designated nodes routes at least a portion of the received traffic flow part to one or more of the plurality of nodes in a second traffic distribution round;

wherein, in response to a determination that any of the traffic flow parts satisfies a queue threshold within the load-balancing network, dropping marked packets of the traffic flow parts with a higher probability than unmarked packets of the traffic flow parts.

18. The apparatus of claim 15, further comprising:

a distributor module coupled to the processor module and the switching module;

wherein the distributor module is adapted for distributing the traffic comprising marked packets and unmarked packets from the processor module as first transmitted traffic in a first distribution round, the first transmitted traffic distributed to the switching module and at least one remote switching module of a respective at least one intermediate node.

19. The apparatus of claim 18, wherein the distributor module comprises a distributor queue having a distributor queue threshold, wherein the distributor module is adapted for, in response to a determination that the distributor queue threshold is satisfied, dropping at least a portion of the traffic, wherein marked packets are dropped with a higher probability than unmarked packets.

20. The apparatus of claim 18, wherein the switching module comprises a switching queue having a switching queue threshold, wherein the switching module is further adapted for:

receiving first received traffic in the first distribution round, the first received traffic including a portion of the first transmitted traffic and other first transmitted traffic received from at least one remote distributor module of respective at least one remote ingress node; and in response to a determination that the first received traffic violates the switching queue threshold, dropping at least a portion of the first received traffic, wherein marked packets are dropped with a higher probability than unmarked packets.

21. The apparatus of claim 20, further comprising:

a collector module coupled to the switching module, wherein the switching module is further adapted for:

distributing second transmitted traffic in a second distribution round, the second transmitted traffic distributed to the collector module and at least one remote collector module of respective at least one egress node.

22. The apparatus of claim 21, wherein the collector module comprises a collector queue having a collector queue threshold, wherein the collector module is further adapted for:

receiving second received traffic in the second distribution round, the second received traffic including a portion of the second transmitted traffic and other second transmitted traffic received from at least one intermediate node; and in response to a determination that the second received traffic violates the collector queue threshold, dropping at least a portion of the second received traffic, wherein marked packets are dropped with a higher probability than unmarked packets.

* * * * *